United States Patent
Bradney et al.

(12)

(10) Patent No.: US 6,208,264 B1
(45) Date of Patent: Mar. 27, 2001

(54) PERSONAL VERIFICATION IN A COMMERCIAL TRANSACTION SYSTEM

(75) Inventors: Monty T. Bradney; Walter L. Stairhime, Jr.; Herbert Wayne Reid, all of Houston, TX (US); George Warfel, Santa Barbara, CA (US)

(73) Assignee: Automated Identification Service, Inc., Katy, TX (US)

( * ) Notice: Subject to any disclaimer, the term of this patent is extended or adjusted under 35 U.S.C. 154(b) by 0 days.

(21) Appl. No.: 09/082,899

(22) Filed: May 21, 1998

Related U.S. Application Data (60) Provisional application No. 60/047,544, filed on May 23, 1997.

(51) Int. Cl.[7] ................................................. G06F 7/04
(52) U.S. Cl. ................................. 340/825.31; 382/115
(58) Field of Search .................... 340/825.31, 385.31; 382/115, 116, 124, 224, 126; 356/301; 235/380, 382

(56) References Cited

U.S. PATENT DOCUMENTS

| | | |
|---|---|---|
| 4,582,985 | 4/1986 | Löfberg ............................ 235/380 |
| 4,729,128 | 3/1988 | Grimes et al. ..................... 382/58 |
| 4,783,823 | 11/1988 | Tasaki et al. ..................... 382/4 |
| 4,993,068 | 2/1991 | Piosenka et al. ................. 380/23 |
| 4,995,086 | 2/1991 | Lilley et al. . |
| 5,053,608 | 10/1991 | Senanayake ..................... 235/380 |
| 5,055,658 | 10/1991 | Cockburn ......................... 235/382 |
| 5,180,901 | 1/1993 | Hiramatsu ......................... 235/380 |
| 5,239,166 | 8/1993 | Graves ............................... 235/380 |
| 5,239,590 | 8/1993 | Yamamoto . |
| 5,245,329 | 9/1993 | Gokcebay ..................... 340/825.31 |
| 5,259,025 | 11/1993 | Monroe et al. ..................... 380/23 |
| 5,337,043 | 8/1994 | Gokcebay ..................... 340/825.31 |
| 5,483,601 | 1/1996 | Faulkner ......................... 382/115 |
| 5,546,471 | 8/1996 | Merjanian ......................... 382/124 |
| 5,559,504 | 9/1996 | Itsumi et al. ..................... 340/825.3 |
| 5,623,552 | 4/1997 | Lane ................................. 382/124 |
| 5,786,893 | * 7/1998 | Fink et al. ......................... 356/301 |
| 5,841,907 | * 11/1998 | Javidi et al. ..................... 382/210 |
| 5,982,932 | * 11/1999 | Prokoski ......................... 382/224 |

\* cited by examiner

*Primary Examiner*—Michael Horabik
*Assistant Examiner*—Matsuichiro Shimizu
(74) *Attorney, Agent, or Firm*—Bracewell & Patterson, L.L.P.

(57) ABSTRACT

A financial transaction customer carries a card key containing a unique, machine-readable code. The code is an encrypted data set representing the user's thumbprint. A scanning system senses the user's thumbprint on or adjacent the card key as he turns the card key in a keyhole. The code and thumbprint are read by laser and must match previously recorded data before an indication of satisfactory identification can be returned. The identification system further includes a centralized database containing data and processing software for recognizing the encoded card keys of the system, in addition to data and processing software for authenticating a user's thumbprint. A network links this centralized database to a number of remote terminals at sites where identification is required. Such a distributed network is common in today's identification systems involving more than one remote site.

15 Claims, 6 Drawing Sheets

PERSONAL VERIFICATION IN A COMMERCIAL TRANSACTION SYSTEM

This application claims the benefit of U.S. Provisional Application No. 60/047,544, filed May 23, 1997.

FIELD OF THE INVENTION

The present invention relates generally to the field of point-of-sale personal verification systems and, more particularly, to a method and system to ensure at a point-of-sale transaction that an individual in possession of a transaction device or instrument such as a credit or debit card key is the one authorized to have the transaction device. The present invention verifies that the holder is properly in possession of the transaction device without necessarily disclosing the identity of the holder, but may be adapted to provide a merchant or other business proprietor with the holder's identity.

BACKGROUND OF THE INVENTION

In financial and commercial transaction systems today, there is a need to positively verify the status of a person who requests goods and services from a system at an unattended site or from someone to whom he is not known. The same is true of one who seeks access to a restricted site. Such systems are commonly used in connection with retail purchases using credit or debit cards, employee access control at restricted areas, and student identification cards at libraries and campus events, among others.

Some existing identification systems use a secret code, often referred to as a personal identification number (PIN). Other systems rely upon one's likeness to a photograph, or the possession of an instrument such as a key or an encoded card in an effort to confirm an individual's identity. Such a system is offered by Identicator Technology of San Bruno Calif. In this system, the verification process compares the holder's unique fingerprint features that are stored on the magnetic stripe of a card or smart card with the cardholder's live finger image. The fingerprint scanning is performed by the holder placing his finger on a peripheral device that authenticates the owner of the card and links the card to the cardholder. Thus, the scanning is performed apart from the data on the card.

Still other methods, including the evaluation of a signature, the matching of finger prints, sensing the likeness of a voice, the geometry of a hand, and other means, may use these or a combination of methods. Unfortunately, such systems often rely upon the skill and attention of busy sales or other service people, and there is often no way to detect if an instrument has been stolen or otherwise not in the possession of one who is authorized to hold the instrument. In other words, the possession of such an instrument does not confirm an individual's identity, or verify that the holder of an instrument is authorized to do so.

The most commonly used identification methods in use today for credit and debit cards is either the PIN system or comparison with a simple, hand-written signature in a space provided on the card. Such means have proved satisfactory in the vast majority of transactions, because most people are in fact honest. However, for the unscrupulous, the security provided by such means has proved to be inadequate. Thus, there remains a need for a means to positively verify the status of an individual at a point of sale for goods or services, or at an unattended site, such as at an automated teller machine and the like.

SUMMARY OF THE INVENTION

The present invention addresses these and other drawbacks of the prior art. In this system, the user carries a specially designed card key containing a machine-readable code that is unique to the proper holder of the card key. In one aspect of the present invention, the code is an encrypted data set representing the user's thumbprint. The system senses the user's thumbprint on or adjacent to the card key when the card key is inserted into or turned in a keyhole or card slot. The code and thumbprint are simultaneously read by a split laser beam and must match with previously recorded data before an indication of satisfactory verification can be returned.

The system further includes a centralized database containing data and processing software for recognizing the encoded card keys of the system, in addition to data and processing software for authenticating a user's thumbprint as just described. A network links this centralized database to a number of remote terminals at sites where identification is required. Distributed networks are common in today's identification systems involving a group of remote sites, and the present invention takes advantage of and improves upon the existing infrastructure of distributed networks.

At each remote site in the system, a counter-top device serves as a terminal unit. The terminal unit includes a keyhole that is readily accessible to the user. The terminal also contains the laser scanner which reads data from the encoded card key and from the thumbprint of the user. In one embodiment, this data is then encoded for secrecy and transmitted to the central database. The data is processed at the central database and a response is returned to the originating terminal. In another, preferred embodiment, authentication of the thumbprint scan and encoded data is performed at the terminal unit.

In another aspect of the present invention, the terminal may also read data from a card or other document or from a keyboard, and transmit this additional data. Further, the terminal may take data pertaining to heart beat, respiration, and oxygen metabolism, through a small hole in the top of the card key. This feature is particularly useful in ensuring that the thumbprint scan is being read from a living, breathing human being, and not a synthetic facsimile of the genuine image.

In a preferred application of the system of the present invention, a card key is issued to each user. All card keys look alike on the outside and differ only by the digital code within the card key. The card key preferably includes a small portion which conforms to the outline of the user's thumb and the entire card key is small enough to fit onto a common key ring. The end of the card key which conforms to the user's thumb has a covering of thin film stretched over it and the inside of the film is coated with a highly reflective material. When the user's thumb is placed over the thin film, the film receives the configuration of the user's thumbprint. The ridges and valleys of the thumbprint are thus reproduced on the mirrored surface of the inside of the film. Since the mirrored surface on the underside of the film is inside the card key, it is protected from surface scratches.

The person who is to be identified places the card key into the keyhole. As the card key is comfortably held, the user's thumb fits over the thin film stretched across an oblique cut at the end of the card key away from the keyhole. The position of the thumb is indexed to the proper orientation by an external tab underneath the card key. This tab fits naturally in the crease in the index finger bent into a crook, as the user grasps the card key between thumb and forefinger.

The presence of the card key in the keyhole activates the terminal. The terminal focuses a laser beam onto the interior reflective surface of the thin film and scans the impressed fingerprint. The beam is also made to scan the floor or bottom of the inside of the card key, extracting the coded data by reflection. Thus, the present invention in one aspect comprises a personal identification system. The system includes a personal identification card encoded with fingerprint data and a scanner to scan the fingerprint data on the card. The system further includes a centralized data and processing unit in communication with the scanner, a comparator to compare the data scanned by the scanner with data previously stored in the centralized data and processing unit, and an arbitrator to determine a match between the fingerprint data encoded on the personal identification card and the data previously stored in the centralized data and processing unit.

As previously described, data may also be obtained from a card, a document reader, or a keyboard, rather than or in addition to the data on the inside of the card key. Biological data, such as heart rate, respiration rate, and oxygen metabolism may also be taken from the user. This package of data is then encoded and sent to the central database or processed at the remote terminal. Once the data is processed, it is matched against data already on file. An encoded reply is transmitted back to the terminal or developed at the terminal to indicate successful or unsuccessful verification or authentication.

A variety of features of this system ensure safe and secure operation. The card key encoding is on the interior of the card key, thus protecting the data encoded on the interior of the card key from damage or copying. For the remote terminal, the processing software is encased in a metal cover of the remote terminal, making it difficult for an intruder to gain access. The cover of the remote terminal is also constructed so that the software within the remote terminal is destroyed if an unauthorized attempt is made to penetrate the remote terminal. Further, thumbprint data is in the central database allowing a card key holder to use the card key at any remote terminal.

In certain known systems or the prior art, verification is begun by a user placing his hand on a surface for scanning, the same surface that every other user has put his hand on. In the present system, the user's thumb touches only his own card key surface, so there is no danger of a virus or a bacterium being passed from one user to another. The laser scan of the fingerprint is performed on the interior reflective surface of the thin film, and does not make contact with the user's thumb. The entire system is passive compared to known systems, even though other systems do not offer the security the present system offers.

These and other features of the present invention will be apparent to those of skill in the art from a review of the following detailed description along with the accompanying drawings.

DETAILED DESCRIPTION OF A PREFERRED EMBODIMENT

The present invention comprises a number of aspects. In one aspect, the present invention includes an apparatus for unambiguously identifying an individual at a point of sale or at a site at which services are provided. In another aspect, this invention includes a system for verifying the entitlement of a person for goods or services requested by the person. In still another aspect, in an exemplary application, the present invention uses the apparatus and the system for enrollment of an individual into a service network, and in this embodiment may compensate the individual for his providing personal information about himself. Finally, the present invention also includes a method of enrolling, identifying, and authenticating the entitlement of enrolled individuals in the service network. Each of these aspects of this invention are described below.

The System

Figure 1:
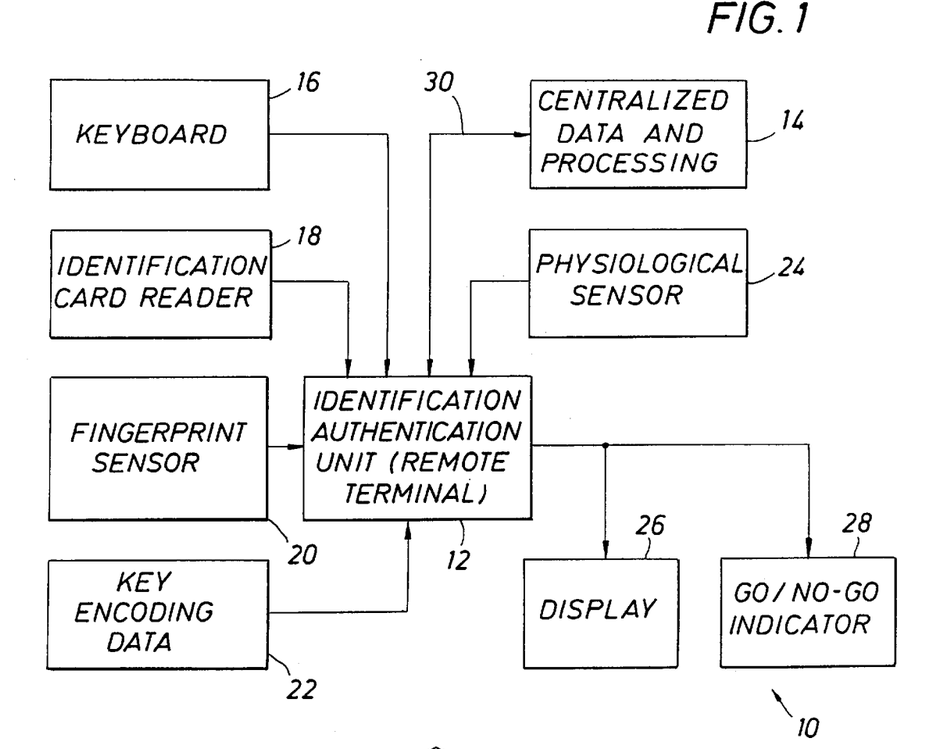
FIG. 1 is a schematic diagram of the personal identification system in accordance with the present invention.

FIG. 1 depicts a block diagram of the various functional components of the system. The system, designated generally as a personal verification system 10, includes a remote access control terminal or identification authentication unit 12. A system employing the present invention includes many remote access control terminals. The remote access control terminal 12 receives a variety of inputs, which may variously include data from a keyboard 16, a swipe-card unit or identification card reader 18, a fingerprint sensor 20, and card key encoding data unit 22, as described more fully below with regard to FIGS. 3, 4, and 5.

Figure 3:
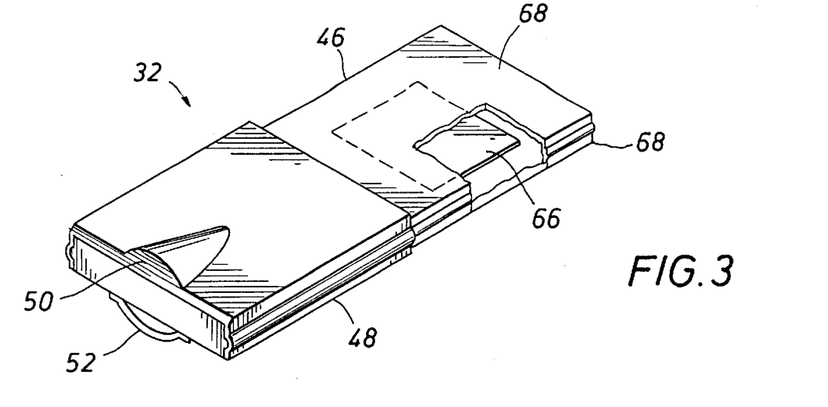
FIG. 3 is a perspective view of a personal card key of the present invention as it is carried by a user.
Figure 4:
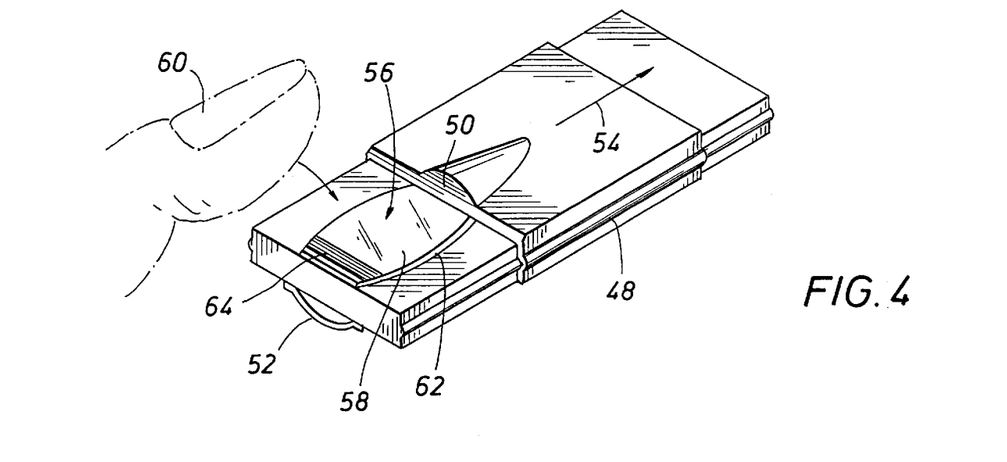
FIG. 4 is a perspective view of a personal card key of this invention in an extended condition prior to scanning the user's thumbprint.
Figure 5:
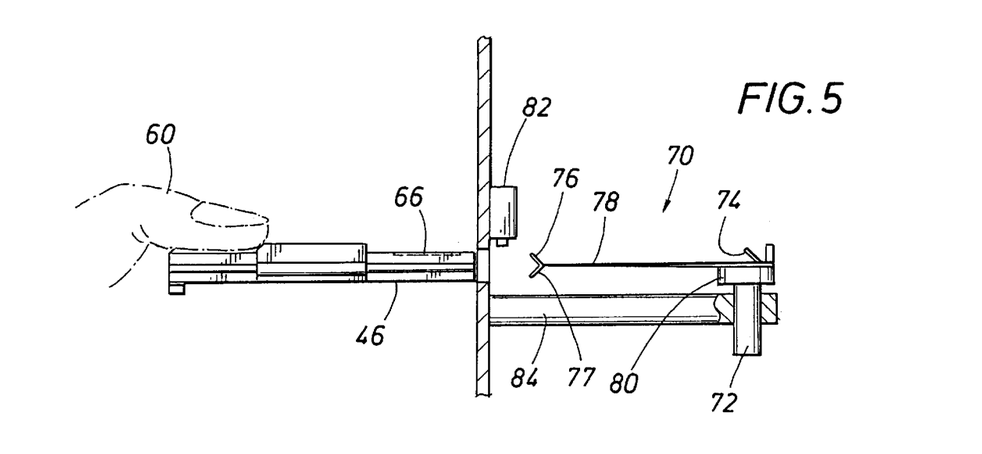
FIG. 5 is a side view of a card key as it is about to be inserted into a remote terminal in accordance with this invention.
Figure 5A:
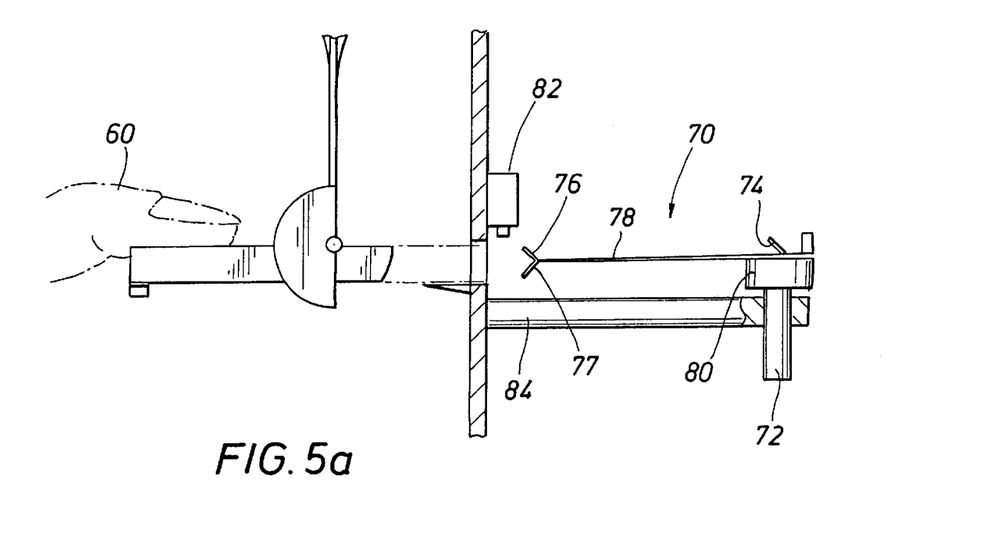
FIG. 5a is a side view of an alternative embodiment of the personal card key as it is about to be inserted into a remote terminal.

Each of the keyboard, ID card reader, fingerprint sensor, and encoding data unit provides digital data to the remote access control terminal 12. The remote terminal may also receive data from a physiological sensor 24 which preferably provides an indication that the data provided by the fingerprint sensor is being provided by a live human being. The physiological sensor 24 may provide such data as heart beat, respiration, and oxygen metabolism sensed through a card key (FIGS. 3–5)

The remote terminal, upon local processing of the data thus provided, provides information for display for an alphanumeric display unit 26, as well as a go/no-go indicator 28, such as green light for "transaction approved" or a red light for "transaction denied."

If desired, authentication and transaction verification may be carried out at a centralized data and processing center 14. It is envisioned that a plurality of remote terminals will be networked to such a center 14. It should also be understood that a data line 30 is bi-directional so that data is freely communicated in both directions. For example, aperiodic updating of encryption data housed in the remote access control terminal 12 may be sent via the data line 30 from the centralized data and processing unit 14 to each of the remote units 12. The encryption data thus distributed may be the same for each remote unit, the data could be unique to each remote unit, or some combination of these features may be used.

The Remote Terminal and Card Key

Figure 2:
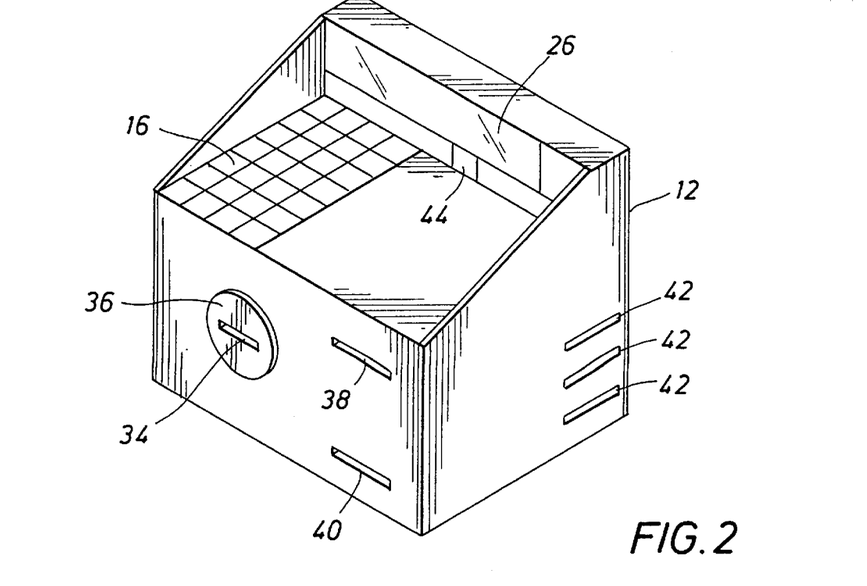
FIG. 2 is a perspective view of a remote terminal of the present invention.

FIG. 2 depicts a presently preferred embodiment of the remote access control terminal 12, and FIGS. 3, 4, and 5 depict a preferred personal card key 32, according to the present invention. The keyboard 16 is provided for the entry of various point-of-sale data in the conventional manner. The display 26 shows the information routinely required of a point-of-sale terminal, plus the customer identification and confirmation data as a result of the present invention. The display 26 also shows user-friendly instructions to the customer to guide him through a transaction.

The remote access control terminal 12 further includes a card key port 34 which receives the card key 32 described below. The card key port 34 is preferably accessible to a user or customer so that the customer can insert the card key 32 into the port 34 without assistance from an attendant. Once the card key 32 is inserted into the port 34, the customer may then rotate the card key and thereby turn the cylinder face 36. When the identity of the customer is satisfactorily verified, the customer may proceed to conduct a transaction as guided by instructions on the display 26.

The remote access control terminal 12 may also include a variety of other desirable features. A check reader 38 and a printer 40 provide enhanced capabilities for a terminal at a financial institution. The printer 40 may provide the customer with a hard copy of a transaction or a series of transactions. This feature may be embodied in DataGlyph™ Technology from Xerox.

The terminal 12 further includes a plurality of input/output (I/O) ports 42 to couple the terminal 12 to other components via a modem line or a direct link to another computer. The I/O ports 42 also link bar code information to other components for such things as inventory control or point-of-sale ordering and billing transactions. The terminal 12 also includes communications port 44 for the use of a smart card or other user card with embedded processor and memory in an alternative embodiment of the present invention.

The presently preferred embodiment of the card key 32 is shown in greater detail in FIGS. 3, 4, and 5. FIG. 3 depicts the card key in the state in which it would normally be carried by a user. The card key comprises a body 46, preferably of molded plastic or metal, and a spring-loaded sliding cover 48. The cover 48 extends over the top and along both sides of the body 46 and the body and cover engage one another along the sides with a tongue and groove arrangement. On the top of the cover 48 is press-plate 50 that is engageable by the user's thumb. Opposite the press-plate 50 and extending from the bottom of the body 46 is a finger grip 52. The finger grip 52 allows the user to hold the body 46 steady while sliding the cover 48 forward in the direction of the arrow 54 in FIG. 4.

When the cover 48 is slid forward, a scan window 56 is exposed. The scan window is preferably covered with a very thin membrane 58, such as Milar. The membrane 58 is coated on the underside (i.e., inside the body 46) with a reflective surface. The membrane is thin enough to conform to the thumbprint of a thumb 60 pressed against the membrane. In that way, the thumbprint is readable from the underside of the membrane when the thumb of the user is registered with the card key as shown in FIG. 5. The scan window 56 is preferably located in a raised portion 62 of the body 46 and against a corrugated ridge 64 to assist the user in properly registering his thumb on the card key. The corrugated ridge 64 also includes the physiological sensors 24 as previously described.

As shown in FIG. 3, an optical data memory 66 is mounted on the underside of the top surface of the body 46. The memory 66 stores data including the fingerprint identification information of the owner of the card key, account number, biographical data, and encryption information specific to the card key.

The data memory is in a format that may be scanned by a laser, as described below, such as that used in high-density CD ROM's and the like. Two-dimensional printed data techniques may alternatively employed, so long as sufficient data capacity is available. The interior of the body 46 is protected by a pair of spring-loaded doors 68 which are opened when the card key is inserted into a terminal.

As shown in FIG. 5, a card key is inserted into a terminal to activate the automatic identification function of the present invention. Inside the terminal is an optical train 70 for reading the data on the optical memory 66 and the thumbprint on the thumb 60. The optical train 70 includes a laser 72, a folding mirror/beam splitter 74, a scan mirror 76, and a scan mirror 77. The scan mirror 76 scans the laser onto the thumbprint and the scan mirror 77 scans the laser onto the optical memory 66. The splitter 74 and the scan mirror are mounted on an oscillating scanning arm 78. The scanning arm is oscillated by a drive motor 80. Insertion of the card key into the terminal is detected by a detector 82, such as a photoelectric detector or any other appropriate type.

When insertion of the card key is detected, the laser scanning mechanism and electronics are activated. The optical train 70 is then driven toward the card key by a screw drive mechanism 84. As the optical train is driven toward the card key, the memory element 66 is scanned and the data thereon is read into identification authentication unit 12 (FIG. 1). The scan mirror 76 continues into the card key until it scans the thumbprint. The scan mirror 76 scans the thumbprint a second time as the optical train is then withdrawn back into the terminal. The scan mirror 77 simultaneously scans the coded memory 66. If the scanning successfully indicates a satisfactory scan, showing a match between the card key (the coded memory 66) and the thumbprint, thereby verifying the status of the card key holder as authorized to possess the card key, the indicator 28 is illuminated and the display 26 may be activated with an appropriate readout.

Figure 4A:
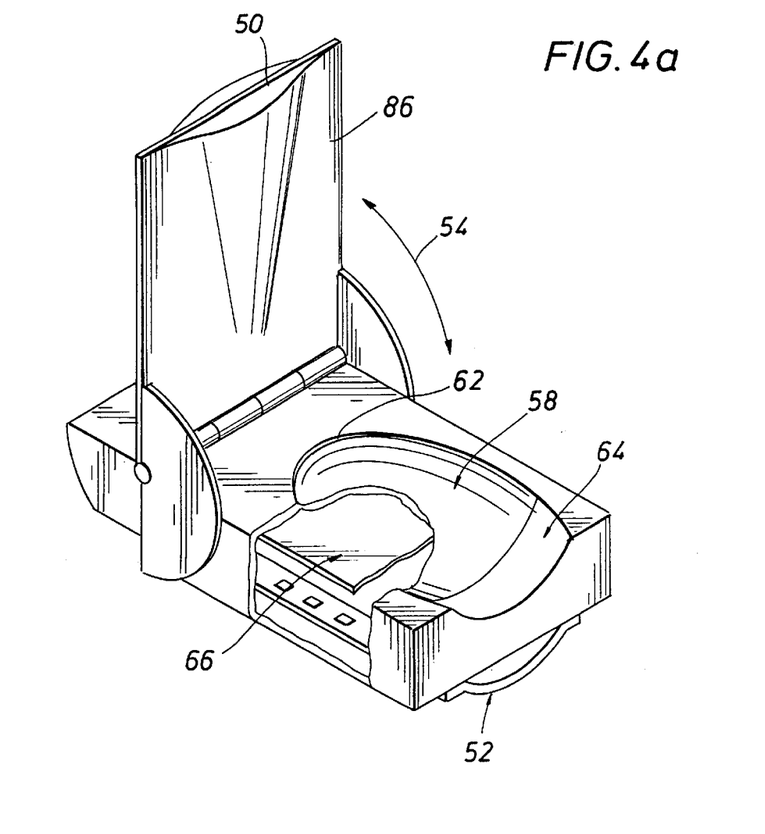
FIG. 4a is a perspective view of an alternative embodiment of the personal card key of this invention.

FIGS. 4a and 5b depict another preferred embodiment of the card key 32 of the present invention. Like elements are shown with like numbers. In this case, however, instead of a linear sliding motion, as in the embodiment of FIGS. 4 and 5, the card key is provided with a flip-top cover 86 that rotates about a mounting axis 88. This embodiment is significantly shorter along the long axis of the card key, but does require some space for opening the cover 86, which is easily available. In all other respects, the card key of FIGS. 4a and 5b operate the same as previously described.

Card keys are preferably encoded at a central processing facility. Once received at the central processing facility, each card is encoded with a unique code which represents the fingerprint of the card holder. Delivery of the encoded cards at each stage should be made through a secure delivery institution to enhance security. All encoded cards are then be delivered back to an enrollment site for delivery to the customer. The customer may then personally pick up his card from a service provider at the enrollment site. The customer is given instructions on how the card works and the benefits of its use. The card is then activated at the enrollment site and is ready for use.

Aspects of the application of the present invention as described below, such as enrollment in an entitlement program and the verification process, are also adaptable to the use of magnetic-stripe cards. Customer's fingerprint images may be encoded on the magnetic stripes of credit cards. These features of the present invention, whether the card key of FIGS. 3–5 or magnetic-stripe card or other means, provide a means to certify one's identity as it relates to personal financial databases, such as bank or credit card accounts. Once it is determined that no one else is using the user's identity, this person can have his credit card, debit card, or even a personal check specially encoded with a fingerprint, thus making it virtually impossible for anyone but the true card holder to use it.

The service provider, in practicing the present invention, maintains a central processing facility for the purpose of enrollment screening of new cardholders and the encoding of cards. The service provider also licenses enrollment facilities to banks and merchants. Certain hardware systems components, such as fingerprint scanners and card readers known in the art, may be adapted to be compatible with this system.

The system verifies an enrollee's identity on site at the point-of-transaction, therefore making it unnecessary to change any existing credit card or debit card communications networks. By providing a secure and private method of spending money for consumers, through the use of encoded cards as described herein, the present invention will significantly increase the use of electronic money cards and therefore enhance profits for banks, merchants, and card issuers alike. This same system can also be used by government, private, and other entities to deter fraud.

The first step in implementing this system is enrollment. Enrollment involves accurate, one-time collection of customer information by any licensed financial institution and entry of the information into a computer system.

Initial Enrollment

Enrollment of applicants employs two basic screening techniques to check customer card applications. First is a search for similarities to other files using name, birth date, race, sex, physical description, and social security number. Next, a pattern-recognition search of the customer's fingerprint images is run against the database to detect possible duplication. Using both of these techniques renders it virtually impossible to fraudulently obtain credit under false pretenses using false identification.

Figure 6:
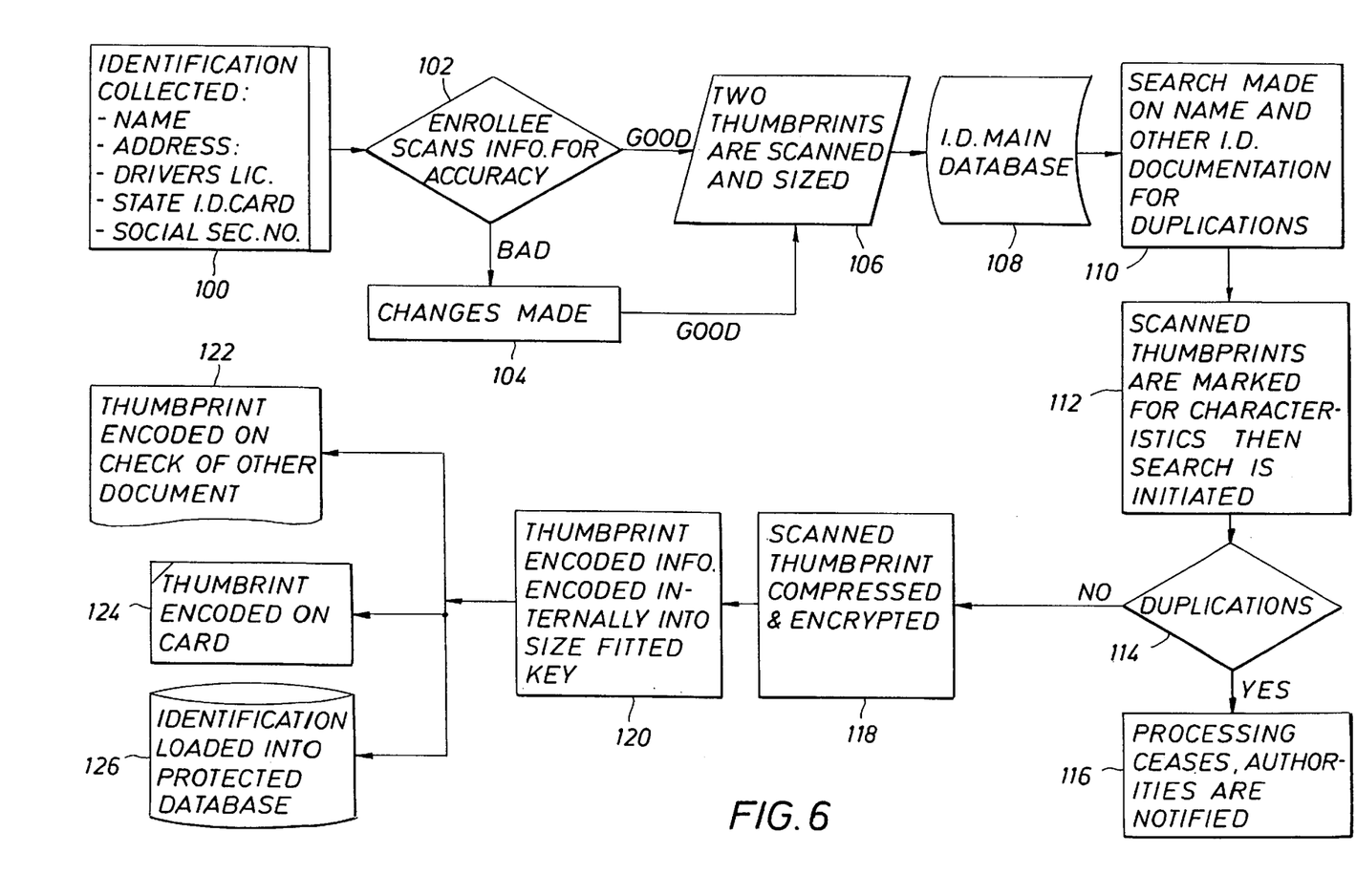
FIG. 6 is a logic flow diagram of an enrollment process in accordance with a feature of the present invention.

FIG. 6 depicts the enrollment process of the present invention. Whether for a currently held credit card or for one newly applied for, the customer purchases the security feature from his credit card issuer as an option for a one time enrollment fee. This option would remain in force until the expiration date on the customer's credit card. The protection then can be renewed on the expiration date for an additional fee.

Referring to FIG. 6, at step 100 the customer applies for security protection at any financial institution or merchant employing this system, providing the same information normally needed for any credit card application: name, address, driver's license number or state ID card, and Social Security number. Driver's license and social Security numbers are most often used as financial identifiers in databases, and this official information would be linked to the customer's unique personal identifier—his fingerprint.

Before any data are entered, the customer checks for accuracy at step 102. If any data are incorrect, the changes are made at step 104.

At step 106, two of the customer's fingerprints (preferably thumbprints) are electronically scanned. The data thus collected are normalized to conform to a standardized format for later identity verification.

At step 108, all information is downloaded to the centralized data and processing center 14 (FIG. 1). In step 110, at the centralized data and processing center 14, a search is made against similar names, driver's license numbers, and Social Security numbers for duplications. The scanned fingerprints are marked at step 112 for characteristics, and a pattern-recognition search for duplicate fingerprint images is conducted.

If any duplications at step 114 are detected, processing ceases at step 116, and the applicant's file is flagged, it is then up to the appropriate card-issuing agency on how to proceed. A determination can then be made to ascertain if a fraudulent application has occurred.

If no duplications are found, the fingerprint images are compressed and encrypted to a specially designed algorithmic number at step 118. This number is then recorded on the magnetic stripe or a Xerox DataGlyph™ of the encoded version of the customer's credit card at step 120. Once this is done, the encrypted data representing the enrollee's thumbprint and associated identification data may be included on a check or other document, as in step 122, a card or other medium, as in step 124, and/or loaded into a protected database, as in step 126.

At this point, the encoded card and card key are returned to the enrollment site to enhance security. The new credit card is then hand-delivered to the customer. Once enrolled in the database, a customer may purchase the security feature of the present invention for any other credit card, debit card and checking account and the information necessary if available as recorded in step 126.

It is important that the enrollee's identification information be accurately verified prior to confirmed entry into the computer system, as the accuracy of this information is the basis of secure identification. An enrollee must be physically present at enrollment for fingerprinting and photographing. Some official identification (e.g., driver's license) may be fraudulent, but once attempts are made to enter this type of identification into the database along with a fingerprint identifier, enrollees may be screened and their enrollment appropriately delayed if questions arise about identity.

This process of pre-verifying applicants may be made available to participating financial institutions, such as credit bureaus. Any institution that uses this service may be required to adhere to the previously described enrollment procedures.

Through this enrollment process, screen process (described below) and the safeguards surrounding these, the present invention assures institutional and individual clients (assuming their full adherence to the system) that no unauthorized or inadvertently issued credit cards, debit cards, or related identification documents should then be able to survive in circulation. This system ensures the most stringent security requirements and maintains the integrity of clients' financial databases.

The Transaction Process

As previously described, enrollment occurs only one time at any licensed financial institution. After one has been enrolled, screening occurs repeatedly at points where a registered cardholder concludes a transaction. Whereas such transactions may take place at a bank (withdrawal of money or cashing a check), they will most commonly occur at a merchant's checkout counter.

Card-swiper devices, capable of reading the magnetic stripes on the backs of credit cards, are in common use at thousands of retail locations nationwide. The system of the present invention preferably functions via the same communications links already accessed by the card-swipers, with the appropriate modification to the swipers so that they could read encoded information, such as fingerprints and the like, to implement the present invention. The only additional hardware required is a fingerprint-scanner.

The following scenario typifies how point of transaction takes place:

To make a purchase of other commercial transaction, a customer provides a protected credit card (VISA™ as an example) to the checkout clerk. In step 130, the checkout clerk runs the customer's card through the card-swiper device already present at the merchant's register. To fully implement the present invention, however, the customer has in his possession a card key of FIGS. 3–5 and places the card key into the remote point-of-sale terminal in step 132. Alternatively, the customer places his finger on the merchant's fingerprint-scanner. Either way, a scan is then made of the customer's thumbprint in step 134.

The system then checks the image of the customer's thumbprint against the print information encoded on the credit card's magnetic stripe or DataGlyph™ in step 136. The preferred system always checks the customer's thumbprint against the information encoded in the key first, and only then checks against data on a card or DataGlyph™. If a match occurs between the print image and the specially encoded card, the transaction is cleared (i.e., a "good" result in FIG. 7) and is sent through the communication links for processing. If information does not match (i.e., a "bad" result in FIG. 7), the read data is checked against the data stored in the centralized data and processing unit 14 at step 138 to verify that the scan process at the point-of-sale is operating satisfactorily. If the information scanned from the customer's card still does not match the print data, the merchant (at his option) may seize the customer's credit card in contemplation of further investigation or otherwise terminate the transaction at step 140.

Figure 7:
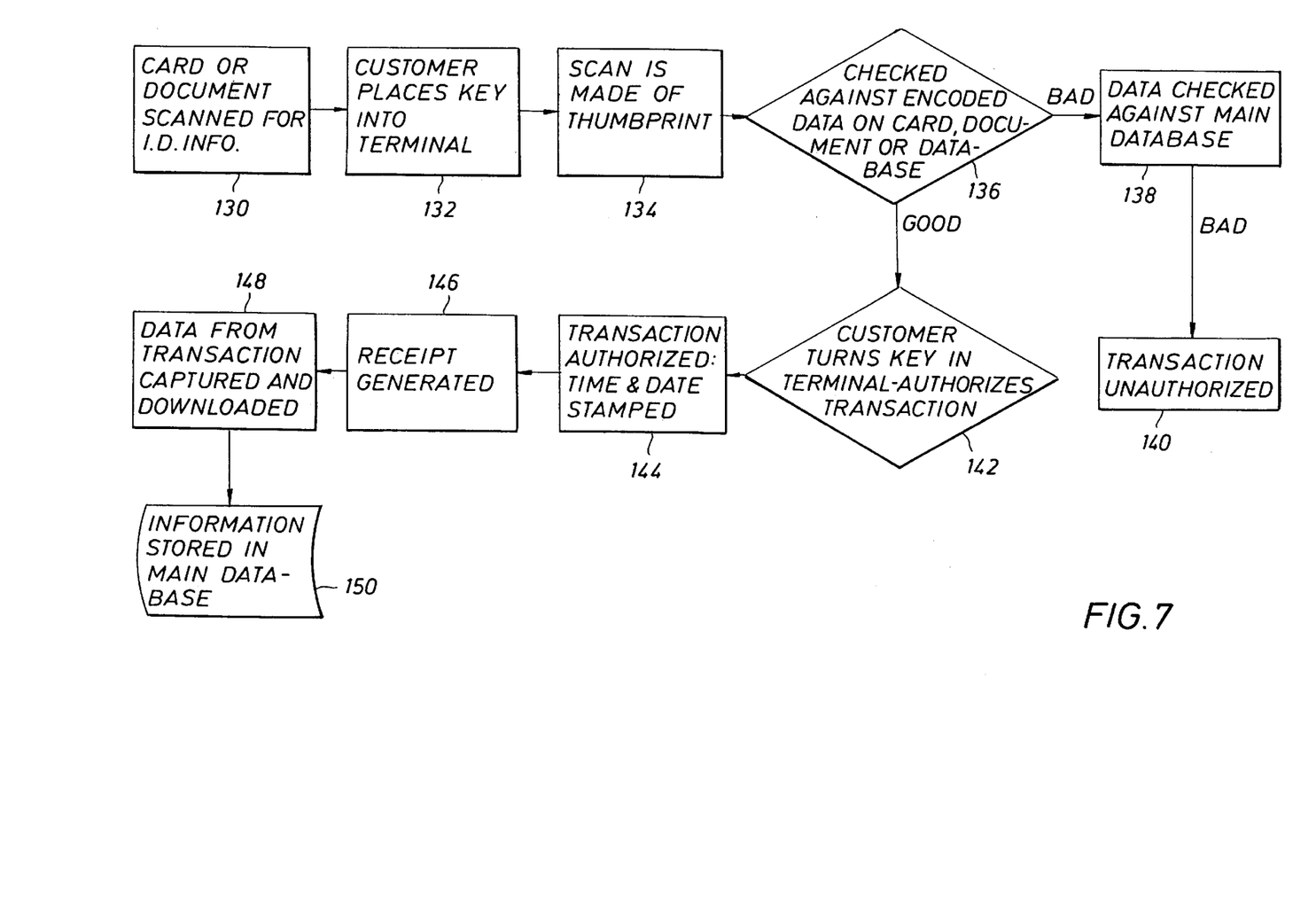
FIG. 7 is a logic flow diagram of a transaction process using the system of the present invention.

Returning to step 136, if the data encoded on the customer's card and the print data match, and the transaction is authorized, the customer turns the card key in the terminal to order the commercial transaction to proceed in step 142. If the transaction is authorized, the transaction is time and date stamped in step 144 and a receipt is generated in step 146. All of the information regarding the transaction is captured in step 148 and stored in the central database in step 150.

Figure 8:
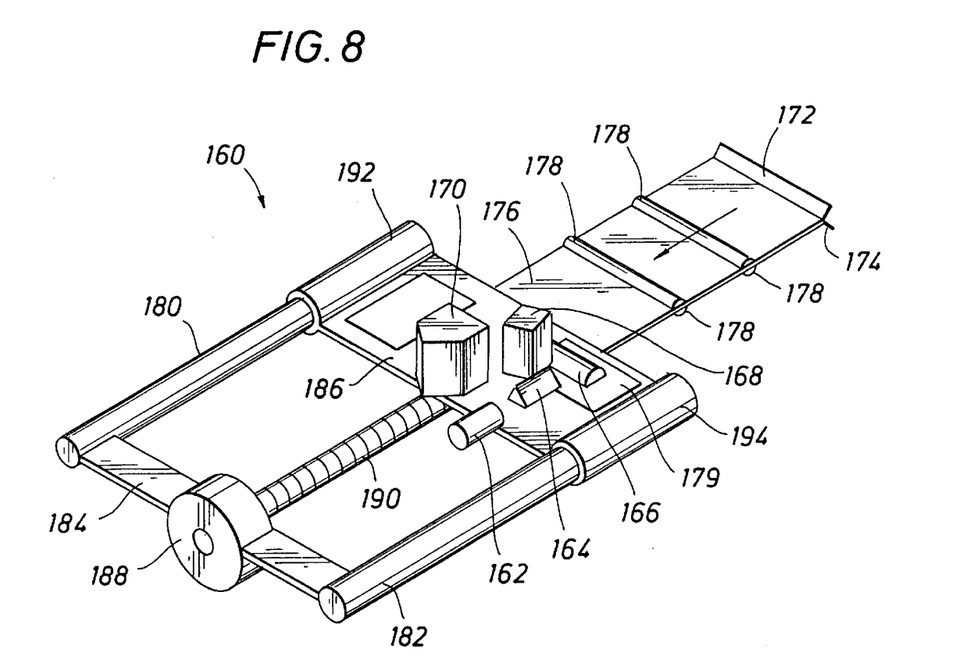
FIG. 8 depicts a perspective view of a preferred scanning mechanism.

FIG. 8 depicts a currently preferred embodiment of a scanning mechanism 160 of the present invention. The scanning mechanism includes the laser light source, optics, and the chassis for such a mechanism.

The device of FIG. 8 has a laser 162 which comes packed with a collimator for a narrow beam of an appropriate cross-sectional shape. Since the entire mechanism and the image to be read are entirely enclosed during the operation of the laser, a low power laser is more than adequate. The laser light is directed through an optical box comprising a condenser and focusing element 164 to more narrowly focus the laser beam. The light is then directed onto a folding mirror 166 which reflects the beam onto a beam splitter/receiver 168. The beam splitter portion of the element 168 splits the laser light into two beams for illumination of the user's finger print and the stored data, respectively. The receiver portions of the beam splitter/receiver 168 allows a photo receiver to be placed in the two return beams. The two separate beams are then simultaneously directed onto a scanning element, such as a rotating mirror 170 in a manner known in the laser scanning art.

After reflection from the scanning element, the beams are directed onto a set of 45° angle mirrors 172,174. The mirror 172 directs the upper beam onto a finger print to be scanned and the mirror 174 directs the lower beam onto recorded data within the key. After the beams are reflected from the finger print and the recorded data, respectively, the somewhat scattered and diffuse light is reflected back onto the mirrors 172, 174 where they are directed back onto the rotating element.

The mirrors 172, 174 are mounted on the end of a platform 176, which moves in and out as the scan is conducted. Also mounted on the platform 176 are a set of scan line refiners 178 which help provide a clean, straight line of scan to ensure coordination of the scans of the fingerprint and the recorded data. The scan line refiners 178 are mounted two each on the top and the bottom of the platform 176.

After the two laser beams scan the finger print and the recorded data and are reflected from the mirrors 172, 174, the light is directed back onto the rotating element 170. The rotating element scans the reflected light back onto the beam splitter/receiver 168, which includes a photo sensitive element to detect the two beams and produce electrical signals, representative of the data from the finger print and the recorded data. These electrical signals are then provided to a receiver printed circuit board 179, which amplifies, filters, and conditions the two signals for subsequent processing as previously described.

The scanning mechanism 160 further includes the frame and drive mechanism for mounting the optics. The mechanism has a pair of parallel guide bars 180, 182, which are coupled by a cross bar 184 and a cross bar 186. The cross bar 184 also provides a mount for a drive motor 188, which drives the platform 176 in and out of the key. To accomplish this, the drive motor 188 and the cross bar 186 are mechanically coupled together by a screw drive 190.

The cross bar 186 is a flat plate to serve as a mount for the optics and circuitry as shown. The cross bar 186 mounts slidingly to the guide bars 180, 182 by a pair of sleeves 192, 194, which slide back and forth over the guide bars as the scanning is performed. Finally, the cross bar 186 may also provide a platform for a drive control printed circuit board 196 or this control circuitry may be provided off the mechanism 160.

In operation, the circuit board 196 controls the drive motor and the laser scan elements, including the laser light. Inserting a key into the mechanism in the direction of the arrow of FIG. 8 initiates a scan. Upon initiation of a scan, the drive motor turns the screw drive to drive the cross bar 186 forward, along with all the associated components. At the end of the insertion, the motor reverses direction and the screw drive pulls the mechanism out of the key. The scan is thus taken in both the forward and reverse directions during the procedure.

Figure 9:
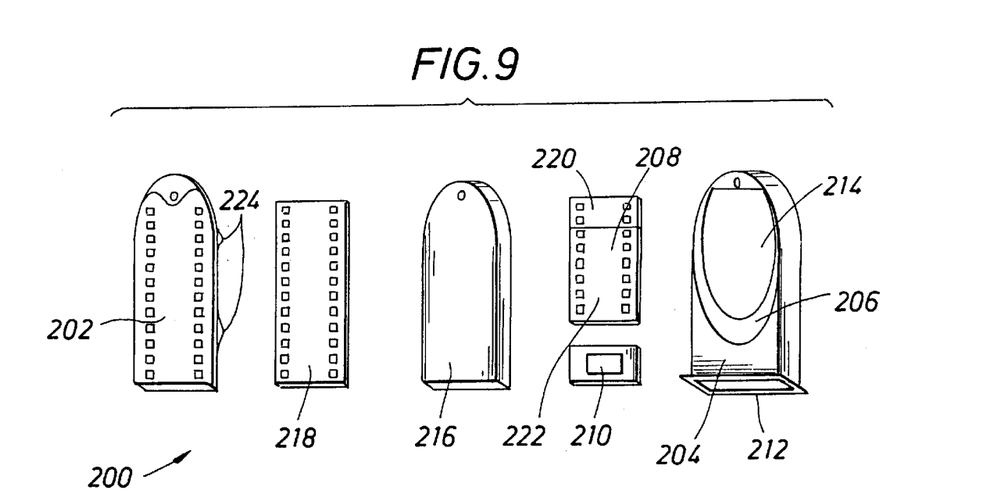
FIG. 9 depicts an exploded view of a preferred key for use in the present invention.

FIG. 9 depicts an exploded view of currently preferred embodiment of a key 200. The key includes a lower cover 202 and an upper cover 204, which fit tightly together to enclose the remaining elements of the key. The upper cover is molded form a bowl 206 which conforms to the contours of the thumb. The upper cover 204 is also molded to include a sprocket on its underside to hold a finger print film 208 in place. The underside also has a cavity to hold a SEEPROM PC board 210 in place. The front end of the upper cover has an upper lip 212 that latches the key 200 in the scanner during a scan. This lip 212 has electrodes (not shown) to the SEEPROM PC board for the input and output of data. The upper cover 204 also includes a finger print window 214 that receives the user's thumb to stage the print for scanning.

The key 200 further includes a tube that receives the platform 176 (FIG. 8) during the performance of a scan. The tube must be made of a light transmissive material to avoid interfering with the laser light, which passes through the top and bottom surfaces of the tube during a scan. The key further includes optical data film 218, which stores the image of the user's print for comparison. The bottom cover 202 is molded with a sprocket to hold corresponding holes in the film 218 in place.

The various parts of the key will now be described in greater detail. The SEEPROM PCB 210 is a serial electrically erasable programmable read only memory. This printed circuit board holds encoded and encrypted data about the key user. The data may be one or more of a variety different kinds of information, including thumb print data which never changes, or changing data such as bank accounts and credit accounts. The transactions, balances and approval codes are stored until updated.

The print window 214 is a hole that holds the thumb in place for a nearly identical print scan each time. The finger print scan through the window 214 comprises two parts, and the print film is segmented accordingly into a window 220 and a window 222. The window 220 is for biological data of the user the window 222 provides for the thumb print scan. Regarding the data that is to be acquired through the window 220, the blood in the user's thumb changes color as the body uses it changing from red to blue. The levels of change vary with each breath and heartbeat, for example. Thus, this factor is used to measure the heart rate and respiration of the user. This denotes health and/or stress of the user, for example, and provides other indicia of the user. The window 222 may be treated to accentuate the ridges of the thumb. This high contrast will make scanning the print faster.

The tube 216 is a slotted tube that is made of transparent plastic. The interior of the tube receiver the platform 176 to let the scanner in to read the optical data and scan the thumb print that is placed on the print film 208.

The optical data film 218 may be sixteen millimeter photographic film. The optical film may include a reflector beneath it to aid in the reading of the data. The data is stored in sixteen shades of gray equaling four bits per pixel. The data is stored at 80,000 bytes per square inch. The data thus stored cannot be changed since it is inaccessibly sealed within the key.

The bottom cover 202 has two large ridges 224 that run horizontally across the outer bottom of the cover. The ridges 224 capture the index finger and keep it back from the key port when in use. The part of the cover that is put into the key port has a lip 212 that is used to hold the key in place while being scanned.

Using known systems with the advantages of the present invention, bearers of stolen or forged cards are too often able to remain unidentified long enough to consummate fraudulent transactions. Merchants should be eager to reduce the loss that they suffer from such criminal acts through the personal identification system as herein disclosed. The present invention also serves to protect customers from such unauthorized use of credit or debit cards.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A personal identification system comprising:
   a. a personal identification key encoded therein with fingerprint data, the fingerprint data inaccessible for scanning from outside the key;
   b. a scanner to receive the key and to scan the fingerprint data in the key, the key comprising:
      i. a hollow tube to receive the scanner;
      ii. a print film on top of the tube;
      iii. an optical data film for permanently storing the encoded fingerprint data; and
      iv. a cover to partially enclose the tube, the print film, and the optical data film;
   c. a centralized data and processing unit in communication with the scanner;
   d. a comparator to compare the data scanned by the scanner with data previously stored in the centralized data and processing unit; and
   e. an arbitrator to determine a match between the fingerprint data encoded in the personal identification key and the data previously stored in the centralized data and processing unit.

2. The personal identification system of claim 1, wherein the cover includes a lip to temporarily latch the key to the scanner during a scan.

3. The personal identification system of claim 1, wherein the cover comprises a top cover and a bottom cover.

4. The personal identification system of claim 3, wherein the top cover includes a window through which a finger print is scanned.

5. The personal identification system of claim 4, wherein the window defines a bowl to conform to a thumb.

6. The personal identification system of claim 3, wherein the bottom cover includes a ridge across the outer bottom of the cover that conforms to an index finger of a user.

7. The personal identification system of claim 1, wherein the scanner includes:
   a. a source of laser light;
   b. a beam splitter to split the laser light into an upper laser beam and a lower laser beam;
   c. a scanning element to scan the upper and lower laser beams;
   d. an upper scan mirror to reflect the upper laser beam onto a finger print of a user and to receive light reflected from the finger print;
   e. a lower scan mirror to reflect the lower laser beam onto the encoded finger print data and to receive light reflected from the encoded finger print data; and
   f. a photosensitive element to receive reflected laser light from the upper scan mirror and the lower scan mirror.

8. The personal identification system of claim 7, wherein the scanning element receives reflected laser light from the upper scan mirror and the lower scan mirror and reflects that light onto the photosensitive element.

9. A personal identification key comprising:
   a. a hollow tube to receive a light scanner;
   b. a print film on top of the tube;
   c. an optical data film for permanently storing encoded fingerprint data; and
   d. a cover to partially enclose the tube, the print film, and the optical data film.

10. The personal identification system of claim 9, wherein the cover includes a lip to temporarily latch the key to the scanner during a scan.

11. The personal identification system of claim 9, wherein the cover comprises a top cover and a bottom cover.

12. The personal identification system of claim 11, wherein the top cover includes a window through which a finger print is scanned.

13. The personal identification system of claim 12, wherein the window defines a bowl to conform to a thumb.

14. The personal identification system of claim 11, wherein the bottom cover includes a ridge across the outer bottom of the cover that conforms to an index finger of a user.

15. A method of personal identification comprising the steps of:
- a. permanently storing encoded finger print data on an optical data film;
- b. mounting the optical data film in a windowed key in which the encoded fingerprint data is not scannable from outside the key, the key comprising:
  - i. a hollow tube to receive a laser light scanner;
  - ii. a print film on top of the tube;
  - iii. an optical data film for permanently storing the encoded fingerprint data; and
  - iv. a cover to partially enclose the tube, the print film, and the optical data film;
- c. simultaneously scanning the encoded finger print data and a finger print with a laser light;
- d. receiving light reflected from the optical data film and the finger print;
- e. processing the received light to determine coincidence between the encoded finger print data and the finger print;
- f. upon a threshold degree of coincidence in step e., indicating a satisfactory scan; and
- g. upon failure of a threshold degree of coincidence in step e., indicating an unsatisfactory scan.

* * * * *